United States Patent Office 3,208,845
Patented Sept. 28, 1965

3,208,845
PRODUCTION OF CALCIUM METAL
Franz Kaess, Traunstein, and Heinrich O. A. Röck, Trostberg, Germany, assignors to Süddeutsche Kalkstickstoff-Werke Aktiengesellschaft, Trostberg, Germany
No Drawing. Filed June 7, 1962, Ser. No. 200,665
7 Claims. (Cl. 75—67)

The invention relates to the production of calcium metal by thermal dissociation of calcium carbide.

Such thermal dissociation at 1500 to 2000° C. in vacuo has already been disclosed in U.S. Patent No. 984,503. The reaction is represented by the equation (1) $$CaC_2 \rightleftharpoons Ca + 2C$$

If technical calcium carbide is used, several side reactions take place which affect the purity of the produced calcium metal. The reason is that commercial calcium carbide contains, depending on its quality, 5 to 17 percent of burnt lime which can react with carbide according to the equation (2) $$CaC_2 + 2CaO \rightleftharpoons 3Ca + 2CO$$

whereby a gaseous mixture of Ca and CO is developed which reacts in the opposite direction to form again carbide and calcium oxide at lower temperature or when the calcium is condensed. Such $CaC_2$ and CaO enter, therefore, as impurities into calcium obtained by reaction (1). In the temperature range of 1200 to 1800° C., the equilibrium pressures of both reactions are not much different so that both reactions take place side by side in the process as carried out on a technical scale. Attempts have been made to recover separately the products of the two reactions; such fractionated condensations have been disclosed in the German Patent No. 1,016,942, and in U.S. Patent No. 2,839,380. It is a principal object of the present invention to provide a method for producing pure calcium from commercial calcium carbide without the complicated and not quite satisfactory fractionated condensation.

Other objects and advantages will be apparent from a consideration of the specification and claims.

In accordance with the present invention, the gaseous reaction products obtained when calcium carbide is heated in vacuo, are passed through a bed of granular carbon having a loose, porous structure, a grain size of about 0.5 to 30 mm., and a large surface, preferably at least 5000 cm.²/g. Reaction mass and carbon bed are maintained above the temperature at which reaction (2) has a higher equilibrium pressure than reaction (1). As shown by thermodynamic calculations, see, for instance, the paper by C. Maron, Zur. Priklad. Chim., vol. 30 (1957), p. 851, said condition is satisfied at a temperature above 1100° C.

We prefer to use temperatures in excess of 1500° C. not only in order to ensure a sufficiently great equilibrium pressure differential but also to obtain a technically suitable reaction rate. A third essential condition consists in maintaining in the first reaction step an absolute pressure which is lower than the equilibrium pressure of reaction (2) but higher than the equilibrium pressure of reaction (1). The total effect of the three features to be maintained in the first step of the thermal dissociation of technical calcium carbide is: Reaction (1) is suppressed and reaction (2) proceeds, whereby the gaseous mixture of Ca and CO passes through the carbon bed in which, due to the chosen reaction conditions, Ca is absorbed, probably with formation of pure $CaC_2$, while the CO escapes. As a result of this procedure, the first phase of the reaction consists in reacting the CaO, which is contained as impurity in technical $CaC_2$, with said $CaC_2$, and in ensuring that only the CO escapes, and that the thermal dissociation proper of the $CaC_2$ takes place in the second phase only after all the CaO present has been reacted. Said second reaction phase is started very simply by lowering the absolute pressure, at constant temperature, below the value of the equilibrium pressure of reaction (1); by all means, the pressure in said first reaction phase should be always below 50 mm. Hg. The same result is obtained when at constant pressure the temperature is increased until the equilibrium pressure of reaction (1) is higher than the absolute pressure. The described process allows of producing pure calcium metal which is free of contamination with $CaC_2$ and CaO.

The carbon layer which has to be passed by the reaction gas, may be provided in various ways. A suitable bed is the residue of reaction (1) because it is a loose spongy material. It may be used in the same grain size as the carbide charge, preferably about 3 to 30 mm. Coke and/or carbon of the same grain size may be used but in the case of coke the calcium may take up additional impurities from the volatile constitutents of the coke ash. The height of the carbon layer must be at least 50 mm. but should not exceed $\frac{1}{10}$ of the height of the carbide layer. An increased effect of the carbon is accomplished by mixing granular carbon into the calcium carbide charge so that several small carbon particles adjoin each carbide grain. In this case, the grain sizes and amounts must be so adjusted that the carbon particles have about $\frac{1}{2}$ to $\frac{1}{5}$ the size of the carbide particles and fit into the interstices between the carbide particles. In this manner, the carbon layer may be mixed with the carbide charge, though a pure carbon layer may be additionally employed.

In another embodiment of the invention, powdery carbide is mixed with powdery carbon and the mixture is compressed to pellets or briquets, which are then heated in a first and second reaction step, whereby also a surface layer of pure carbon may be additionally provided.

As reactor, we may use, for example, graphite crucibles equipped with suitable outlets for the removal of the reaction gases, and provided for external electric heating.

The pressure range within which reaction (2) takes place and reaction (1) is suppressed, increases with increasing temperature. On the basis of the thermodynamic calculations referred to hereinabove, which relate to the pure solid compounds CaO and $CaC_2$, the following values are used:

| Temperature °C | 1,400 | 1,600 | 1,800 |
|---|---|---|---|
| Pressure: | | | |
| Lower limit mm. Hg | 0.12 | 0.9 | 4.6 |
| Upper limit mm. Hg | 0.46 | 7.0 | 65 |

Preferably, a pressure in the upper half of the range is applied in order to suppress reaction (1) as far as possible. For instance, at 1600° C., an operating pressure of 5 mm. Hg. is applied for the first stage of the reaction; after termination of said first stage, the pressure is lowered considerably below the lower limit given in the above table in order to decompose the calcium carbide in the second stage of the reaction.

The known procedures for the preparation of calcium from calcium carbide operate at such low pressures where the reactions (1) and (2) proceed simultaneously. There was no teaching as to how to utilize the calcium produced by reaction (2) or to separate it from carbon monoxide. Particularly, the temperature-pressure relationship had not been recognized which makes it possible to carry out reaction (2) while suppressing reaction (1). The drawbacks of the prior art methods are avoided according to the invention by a two-step process which presents the advantages of a simpler condensation of the calcium vapor, and a higher yield of pure calcium metal calculated on the weight of the technical calcium carbide charge.

The following example is given to illustrate the method of the invention.

Example

A charge of calcium carbide (80% $CaC_2$; 14% $CaO$), grain size 3 to 30 mm., was placed in a reactor and covered with a 200 mm. high layer of residual graphite, grain size 3 to 10 mm., through which the gases developed in the carbide charge had to pass. The weight proportion of calcium carbide to graphite was 20:3.

The charge including the graphite layer was heated at 1600° C. while the reactor was evacuated to a pressure of 5 mm. Hg. Said temperature was maintained for 3 hours whereby towards the end of this first reaction stage the pumping power had to be reduced to avoid lowering the pressure below the admissible range.

Subsequently, the second reaction stage was started at the same temperature of 1600° C. by applying full power of the vacuum pump system. After ¼ hour, the pressure had dropped to 0.01 mm. Hg, whereupon the calcium carbide was decomposed at 1600° C., during a period of 6 hours.

From 20 parts by weight of calcium carbide, there were obtained 10.8 parts of crude metallic 95% calcium which contained still 1.5% $CaC_2$, 3% $CaO$, and traces of Al, Si, and Fe from the impurities of the original carbide. On distillation, the crude calcium produced 10.3 parts of pure calcium containing only 0.08% $CaC_2$, corresponding to a yield of 51 percent of pure calcium, calculated on calcium carbide.

We claim:

1. A process for producing calcium by thermal dissociation of commercial calcium carbide which comprises heating a charge consisting of a lower bed of calcium carbide, which contains calcium oxide, and an upper layer of carbon particles having a large surface and a grain size of about 0.5 to 30 mm., in a first step at a temperature of about 1500 to 1800° C. and at a pressure which is above the equilibrium pressure of the reaction (1)  $CaC_2 \rightleftharpoons Ca + 2C$ but below the equilibrium pressure of the reaction (2)  $CaC_2 + 2CaO \rightleftharpoons 3Ca + 2CO$ so as to ensure substantial suppression of reaction (1) in said first step, the height of said carbon layer being substantially sufficient to absorb the calcium developed in reaction (2) in said first step, subsequently, after reaction (2) has been substantially terminated, continuing heating said charge at a temperature within said temperature range at a pressure below the equilibrium pressure of reaction (1), thereby dissociating the calcium carbide and evaporating the dissociated calcium as well as the calcium absorbed in said upper carbon layer, and condensing said evaporated calcium.

2. A process as claimed in claim 1 wherein the temperature in said second step is substantially the same as in said first step and the pressure is reduced below the dissociation pressure of the calcium carbide at said temperature.

3. A process as claimed in claim 1 wherein said second reaction step is carried out at a higher temperature, within said temperature range, than the first reaction step at substantially the pressure of said first step.

4. A process as claimed in claim 1 wherein the pressure in the first reaction step is below 50 mm. Hg and is lower in the second reaction step than in the first reaction step.

5. A process as claimed in claim 1 wherein said upper layer has a thickness of at least 50 mm. and not more than $\frac{1}{10}$ the height of the carbide charge.

6. A process as claimed in claim 1 wherein carbon is used which is the residue of a preceding calcium carbide dissociation.

7. A process as claimed in claim 1 wherein the carbon has a specific surface of at least 5000 cm.$^2$/g.

References Cited by the Examiner

UNITED STATES PATENTS 2,839,380   6/58   Jaffe et al. _____ 75—10
2,931,719   4/60   Menegoz et al. _____ 75—67 X

OTHER REFERENCES

Mikulinskii et al.: Preparation of Calcium by the Decomposition of Calcium Carbide.

Translation Series, U.S. Atomic Energy Comm., Office of Technical Information, March 1961.

BENJAMIN HENKIN, *Primary Examiner.*

WINSTON A. DOUGLAS, *Examiner.*